(12) United States Patent
Yumoto

(10) Patent No.: US 8,170,034 B2
(45) Date of Patent: May 1, 2012

(54) PACKET FORWARDING SYSTEM AND PACKET FORWARDING DEVICE

(75) Inventor: Katsuyuki Yumoto, Tokyo (JP)

(73) Assignee: Hewlet-Packard Development Company, L.P., Houston, TX (US)

( * ) Notice: Subject to any disclaimer, the term of this patent is extended or adjusted under 35 U.S.C. 154(b) by 910 days.

(21) Appl. No.: 11/817,611

(22) PCT Filed: Mar. 1, 2005

(86) PCT No.: PCT/JP2005/003361
§ 371 (c)(1),
(2), (4) Date: Aug. 31, 2007

(87) PCT Pub. No.: WO2006/092844
PCT Pub. Date: Sep. 8, 2006

(65) Prior Publication Data
US 2009/0022167 A1    Jan. 22, 2009

(51) Int. Cl.
*H04L 12/28* (2006.01)
(52) U.S. Cl. .................. 370/401; 370/389; 370/474
(58) Field of Classification Search .......... 370/230–253, 370/503, 222–225, 256–257, 389–427, 474; 709/203, 220, 238
See application file for complete search history.

(56) References Cited

U.S. PATENT DOCUMENTS

| | | | | |
|---|---|---|---|---|
| 6,711,171 B1 * | 3/2004 | Dobbins et al. | ............... | 370/400 |
| 6,724,734 B1 * | 4/2004 | Shabtay et al. | ............... | 370/254 |
| 6,735,198 B1 * | 5/2004 | Edsall et al. | .................. | 370/389 |
| 7,283,476 B2 * | 10/2007 | Bare | .............................. | 370/236 |
| 7,606,229 B1 * | 10/2009 | Foschiano et al. | ............ | 370/392 |
| 2002/0186694 A1 * | 12/2002 | Mahajan et al. | ............... | 370/390 |
| 2003/0142685 A1 * | 7/2003 | Bare | ............................. | 370/410 |
| 2004/0218542 A1 * | 11/2004 | Lee | ................................ | 370/248 |
| 2004/0225725 A1 * | 11/2004 | Enomoto et al. | ............. | 709/220 |
| 2005/0254440 A1 * | 11/2005 | Sorrell | .......................... | 370/264 |

FOREIGN PATENT DOCUMENTS

| | | | |
|---|---|---|---|
| JP | 10-336226 A | | 12/1998 |
| JP | 2004-128805 A | | 4/2004 |
| JP | 2004-274477 A | | 9/2004 |
| WO | WO 03036438 | * | 5/2003 |
| WO | WO03036438 | * | 6/2003 |

* cited by examiner

*Primary Examiner* — Pao Sinkantarakorn
*Assistant Examiner* — Iqbal Zaidi

(57) ABSTRACT

In a forwarding device connected to a network including a plurality of communication nodes connected to each other, in which a plurality of communication routes, each for forwarding a signal through at least one of the communication nodes can be present between arbitrary ones of the communication nodes, a forwarding method according to the present invention determines that the received packet is a BPDU or a local BPDU, and discards the BPDU if the received packet is the BPDU and fetches an original BPDU from the local BPDU if it is the local BPDU. In the case where the BPDU is to be transmitted, the BPDU is created and wrapped in a format of the local BPDU. Then, the wrapped BPDU is broadcasted. In this manner, the local BPDU can be exchanged without affecting the other bridges having a normal spanning tree function.

20 Claims, 18 Drawing Sheets

OPERATION OF LOCAL SPANNING TREE
S30

PACKET FORWARDING SYSTEM
1

FIG. 6

| DA | SA | TYPE | LSTP MAGIC | LSTP VERSION | BPDU |

RECEIVING PROCESS OF LOCAL SPANNING TREE
PROGRAM 200
S10

TRANSMITTING PROCESS OF LOCAL
SPANNING TREE PROGRAM 200
S20

COMMUNICATION SYSTEM
3

COMMUNICATION IF OF NW FILTER BRIDGE 4
40

ACTIVATING PROCESS OF NW FILTER BRIDGE
S40

OPERATION OF LOCAL SPANNING TREE
S50

FIG. 16

| DA | SA | TYPE | LSTP MAGIC | LSTP VERSION | LSTID | BPDU |

PRIORITY DETERMINING PROCESS
S60

OPERATION OF LOCAL SPANNING TREE
S70

PACKET FORWARDING SYSTEM AND PACKET FORWARDING DEVICE

RELATED APPLICATION

The present application is based on, and claims priority from International Application Number PCT/JP2005/003361 filed Mar. 1, 2005, the disclosure of which is hereby incorporated by reference herein in its entirety.

TECHNICAL FIELD

The present invention relates to a packet forwarding system and a packet forwarding device, which use a MAC bridge in a second layer of OSI (Open Systems Interconnection), and more particularly to a packet forwarding system and a packet forwarding device using a spanning tree protocol.

BACKGROUND ART

For example, Patent Document 1 discloses a method of forwarding a packet, ensuring an interconnection with an existing device in accordance with standards, recommendations and the like.

For example, Patent Document 2 discloses a method of forwarding data transfer between equipment connected to a first network and equipment connected to a second network.

However, none of the above articles are directed to achieving a redundant configuration of equipment without affecting an existing network environment.

Patent Document 1: JP 2004-128805 A
Patent Document 2: JP 2004-274477 A
Non-Patent Document 1: ANSI/IEEE 802. 1D, 1993 Edition, MAC Bridges Section 4. The Spanning Tree Algorithm and Protocol

DISCLOSURE OF THE INVENTION

Problem to be Solved by the Invention

The present invention has been developed in view of the above-described shortcomings, and is directed to providing a packet forwarding system and a packet forwarding device, which employ a redundant configuration without affecting an existing network environment to enable the use of a spanning tree.

Means for Solving the Problem

In order to achieve the above mentioned object, a signal forwarding system according to the present invention includes a plurality of communication nodes, the plurality of communication nodes including a plurality of forwarding devices, a plurality of communication routes, each for forwarding a signal through at least one of the communication nodes, being possibly present between arbitrary communication nodes, and in the signal forwarding system, each of the forwarding devices includes: transmission means for receiving a first signal from another one of the communication nodes to create a second signal containing the first signal, the second signal not being used by the another communication node for selection of a communication route, and of transmitting the second signal to a further another one of the communication nodes; and selection means for receiving the second signal from the further communication node and selecting one from the plurality of communication routes in accordance with the first signal contained in the second signal.

Further, a forwarding device according to the present invention is connected to a network including a plurality of communication nodes connected to each other, a plurality of communication routes, each for forwarding a signal through at least one of the communication nodes, being possibly present between arbitrary ones of the communication nodes in the network, and includes: transmission means for receiving a first signal from another one of the communication nodes to create a second signal containing the first signal, the second signal not being used by the another communication node for selection of a communication route, and transmitting the second signal to a further another one of the communication nodes; and selection means for receiving the second signal from the further communication node and selecting one from the plurality of communication routes in accordance with the first signal contained in the second signal.

Preferably, the signal is a packet, and the transmission means wraps the first signal to create a packet containing the first signal as a part of data and then transmits the packet to the further another communication node.

Preferably, the first signal is a hello packet transmitted and received between the communication nodes in accordance with a spanning tree protocol.

Preferably, the selection means selects a communication route through which the signal transmitted and received by an arbitrary one of the communication nodes can be forwarded without passing one communication node twice or more times.

Preferably, the forwarding device further includes at least two input and output means for inputting and outputting the signal, and in the forwarding device, the selection means determines whether or not to allow each of the input and output means to input and output the signal in accordance with a spanning tree protocol, and the signal can be forwarded if the at least two input and output means are allowed to input and output the signal.

Preferably, each of the input and output means is contained in any of at least two groups, and the signal can be forwarded if the at least two groups contain the input and output means allowed to input and output the signal.

Preferably, the forwarding device further includes priority storing means for storing priority indicating a predetermined order of priority, and in the forwarding device, the transmission means creates the second signal further containing the stored priority and transmits the second signal to a further one of the communication nodes, and the selection means selects one from the plurality of communication routes in accordance with the priority contained in the second signal received from the further communication node and the stored priority.

Preferably, the selection means discards the second signal if the priority contained in the second signal received from the further communication node is higher than the stored priority.

Preferably, the selection means discards the second signal if the priority contained in the second signal received from the further communication node is lower than the stored priority.

Preferably, the selection means selects one from the plurality of communication routes if the priority contained in the signal received from the further communication node and the stored priority are identical with each other.

Further, a forwarding method according to the present invention is used for a forwarding device connected to a network including a plurality of communication nodes connected to each other, a plurality of communication routes, each for forwarding a signal through at least one of the communication nodes, being possibly present between arbitrary ones of the communication nodes in the network, and includes receiving a first signal from another one of the communication nodes to create a second signal containing the first signal, the second signal not being used by the another communication node for selection of a communication route, and transmitting the second signal to a further another one of the communication nodes; and receiving the second signal from the further communication node and selecting one from the plurality of communication routes in accordance with the first signal contained in the second signal.

Furthermore, a program according to the present invention is used for a forwarding device including a computer and connected to a network including a plurality of communication nodes connected to each other, a plurality of communication routes, each for forwarding a signal through at least one of the communication nodes being possibly present between arbitrary ones of the communication nodes in the network, and includes the steps of: receiving a first signal from another one of the communication nodes to create a second signal containing the first signal, the second signal not being used by the another communication node for selection of a communication route, and transmitting the second signal to a further another one of the communication nodes; and receiving the second signal from the further communication node and selecting one from the plurality of communication routes in accordance with the first signal contained in the second signal.

Effect of the Invention

According to the present invention, a redundant configuration is employed without affecting an existing network environment so that a spanning tree may be used.

BRIEF DESCRIPTION OF THE DRAWINGS

FIG. 6 A view showing a data structure of a packet wrapped by the local spanning tree program 200.

FIG. 16 A view showing a data structure of a packet wrapped by the local spanning tree program 600.

BEST MODE FOR CARRYING OUT THE INVENTION

[Background of the Present Invention]

For ease of understanding of the present invention, the background of achievement of the present invention will be first described.

Figure 1A:
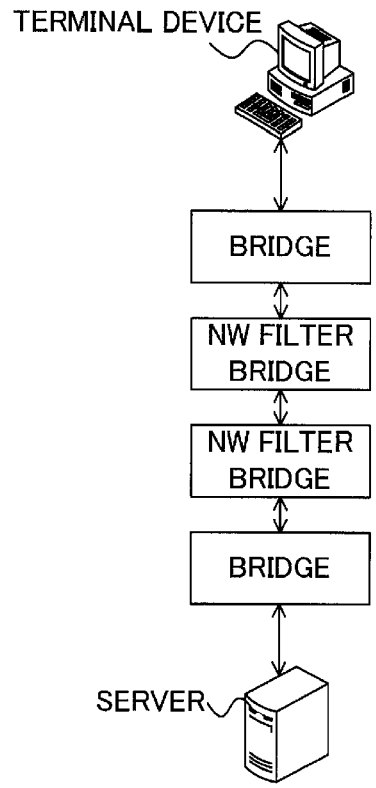
FIG. 1 A view illustrating a redundant configuration of a network filter bridge having a predetermined packet processing function, where FIG. 1(*a*) shows a series redundant configuration and FIG. 1(*b*) shows a parallel redundant configuration.
Figure 1B:
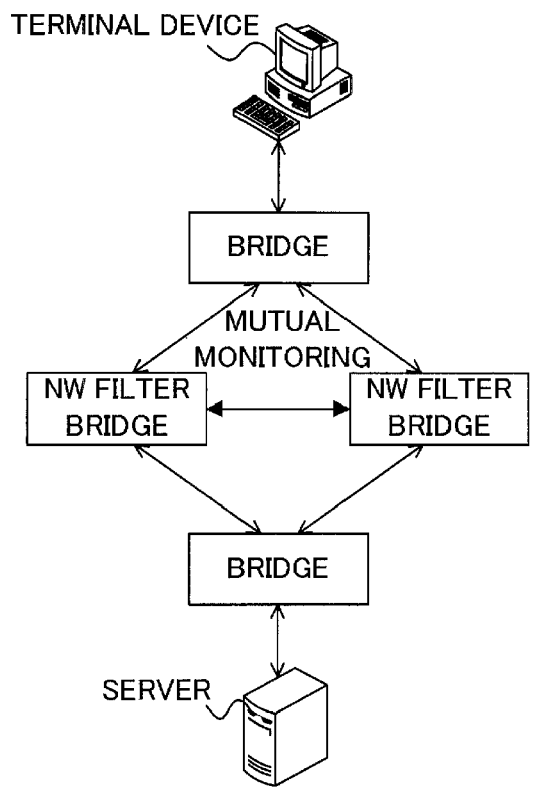

FIG. 1 is a view illustrating a redundant configuration of a network (NW) filter bridge having a predetermined packet processing function, where FIG. 1(*a*) shows a series redundant configuration and FIG. 1(*b*) shows a parallel redundant configuration.

As shown in FIGS. 1(*a*) and 1(*b*), after the NW filter bridge receives a packet transmitted from a server or a terminal device and processes it by modifying a part of data contained in the packet or the like, the NW filter bridge outputs the processed packet.

In a series redundant configuration, two NW filter bridges are connected in series to be connected to a terminal or a server through bridges.

The NW filter bridge includes a plurality of interfaces, through which the NW filter bridge is connected to the bridge or the like.

If a failure such as a hardware failure or a software failure occurs in any of the NW filter bridges, the NW filter bridge, in which the failure occurs, short-circuits two interfaces.

If the two interfaces are short-circuited, the other NW filter bridge, in which a failure does not occur, performs a predetermined packet processing process.

As described above, the NW filter bridges employ a series redundant configuration, so that the packet processing process is continued even if a failure occurs in any one of the NW filter bridges. Therefore, the server can continue providing a service for the terminal device.

However, if a failure occurs in a wiring between two NW filter bridges or in a wiring between a NW filter bridge and a bridge, the server cannot continue providing a service because the connection is physically disconnected.

In a parallel redundant configuration, each of two NW filter bridges is connected to a terminal device and a server through a bridge.

A predetermined wiring is provided between the two NW filter bridges. The two NW filter bridges use the wiring to monitor each other for keep-alive check.

The keep-alive check is done between the two NW filter bridges, so that any one of the NW filter bridges is activated whereas the other NW filter bridge is deactivated. Therefore, the two NW filter bridges are prevented from being both activated.

The packet processing process is performed by the activated NW filter bridge.

If a failure occurs in the active NW filter bridge, the other NW filter bridge is activated to continue the packet processing process.

However, if a failure occurs in the connection for mutual monitoring so that the NW filter bridges can no longer monitor each other, both the NW filter bridges are adversely activated, making the server unable to continue providing a service in some cases.

Figure 2:
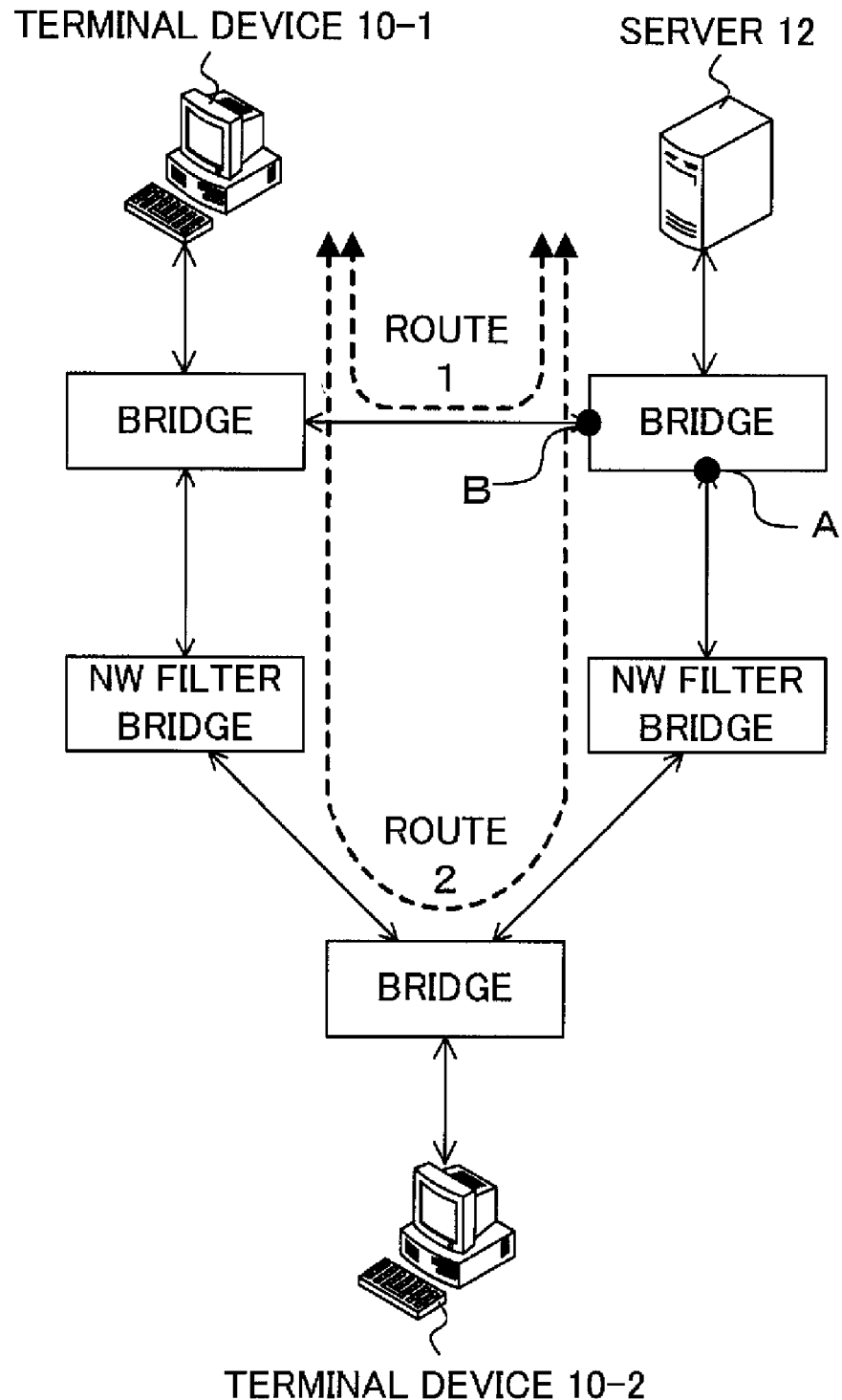
FIG. 2 A view showing a network including two NW filter bridges provided with redundancy and three bridges having a spanning tree function.

FIG. 2 is a view showing a network including two NW filter bridges provided with redundancy and three bridges having a spanning tree function.

As shown in FIG. 2, the NW filter bridges can be provided with redundancy without mutual monitoring.

A server 12 and terminal devices 10-1 and 10-2 are connected to the network through any of the bridges.

The server 12 provides a service for the terminal device 10-1 without passing through the NW filter bridge, while providing a service to the terminal 10-2 after performing a packet processing process through the NW filter bridge.

Since the network is formed on a loop, the three bridges use the spanning tree function to determine a route through which the packet passes to avoid a network loop.

Herein, spanning tree protocols are described as follows.

1. A BPDU (Bridge Protocol Data Unit) is exchanged between the bridges to select a single root bridge.

2. A root port (RP; an interface having the shortest route from a bridge to the root bridge) is selected.

3. A designated port (DP) and a blocked port (BP) are selected.

The packet is transmitted from and received by the RP and DP but not from or by the BP.

The BP is selected based on a predetermined algorithm.

If a point A is selected as the BP in the network shown in FIG. 2, the packet transmitted and received between the server 12 and the terminal device 10-1 is forwarded through a route 1.

On the other hand, if a point B is selected as the BP, the packet is forwarded through a route 2.

In this case, if the packet is processed by the NW filter bridge, in some cases, the server cannot properly provide a service for the terminal device 10-1.

[First Embodiment]

Figure 3:
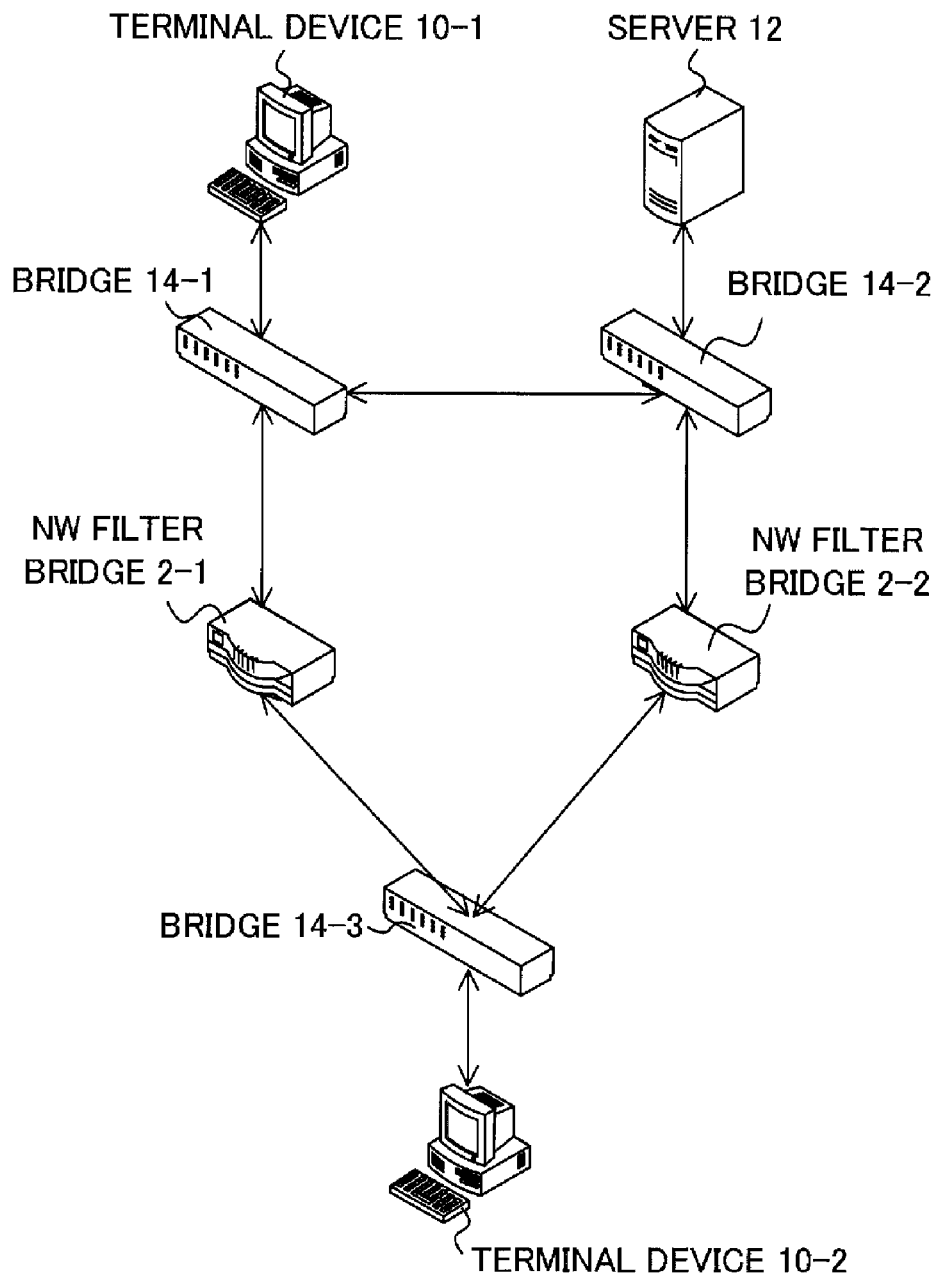
FIG. 3 A view showing a configuration of a packet forwarding system 1 according to a first embodiment of the present invention.

FIG. 3 is a view showing a configuration of a first packet forwarding system 1 according to the present invention.

As shown in FIG. 3, the packet forwarding system 1 includes NW filter bridges (packet forwarding devices) 2-1 and 2-2, terminal devices 10-1 and 10-2, a server 12 and bridges 14-1 to 14-3.

A network on a loop is formed by the NW filter bridges 2-1 and 2-2 and the bridges 14-1 to 14-3. The terminal device 10-1, the server 12 and the terminal device 10-2 are connected to the network on the loop through the bridges 14-1 to 14-3, respectively.

Hereinafter, the servers and the like are also collectively referred to as nodes.

When any of components present in the plural form such as the NW filter bridges 2-1 and 2-2 is to be designated without being specified, it is abbreviated simply as the NW filter bridge 2 and the like.

The NW filter bridges 2-1 and 2-2 have a redundant configuration. Any one of the NW filter bridges is activated to perform a packet processing process and a packet forwarding process.

The NW filter bridges 2 and the bridges 14 have a spanning tree function to perform a predetermined process in accordance with a spanning tree protocol.

[Hardware]

Hereinafter, the hardware of each of the nodes will be described.

Figure 4:
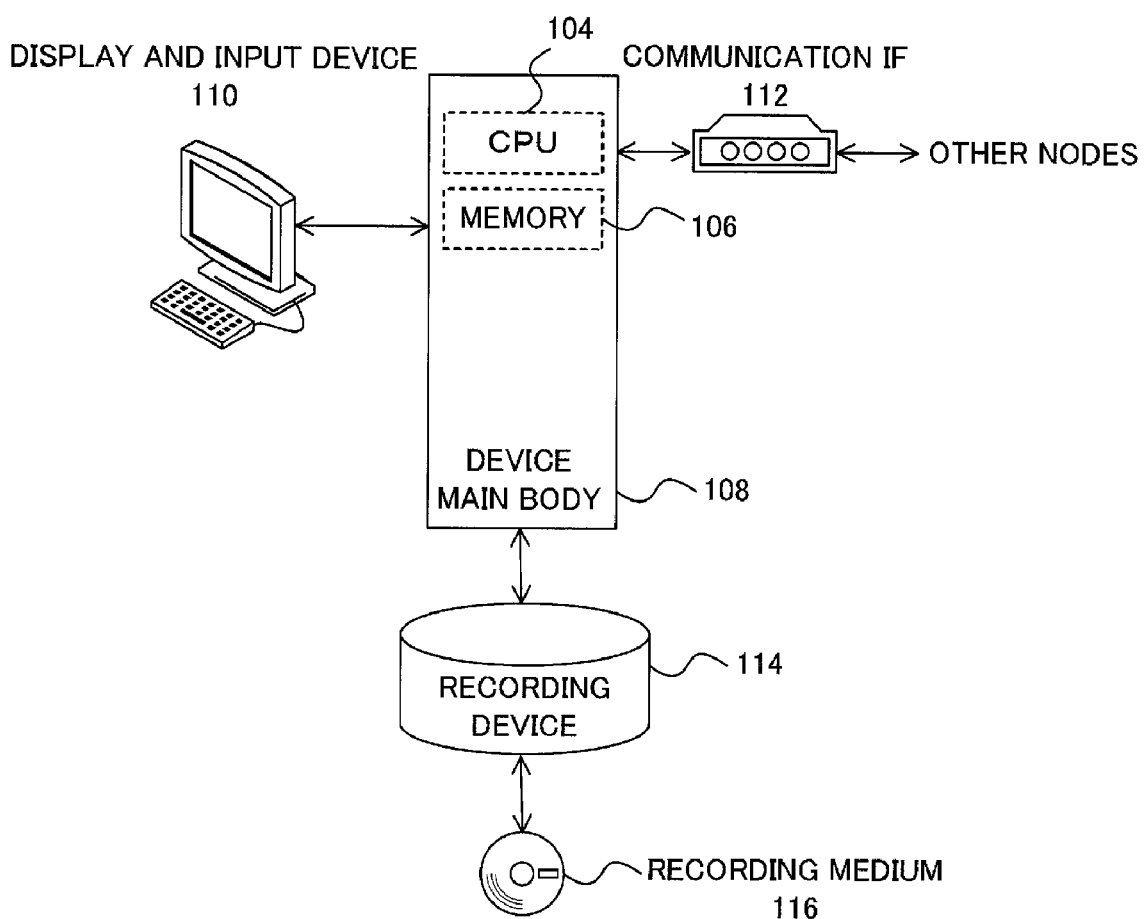
FIG. 4 A view illustrating a hardware configuration of a computer used at each node shown in FIG. 3.

FIG. 4 is a view illustrating a hardware configuration of a computer used at each of the nodes shown in FIG. 3.

As shown in FIG. 4, a computer at each of the nodes includes: a device main body 108 including a CPU 104, a memory 106 and the like; a display and input device 110 including a keyboard, a display and the like; a communication interface (IF) 112 for communicating with the other nodes; and a recording device 114 for recording and reproducing data on and from a recording medium 116.

Specifically, the computer at each of the nodes has a component as a computer capable of performing information processing by the execution of a program and communication with the other nodes through the network.

[Software]

Hereinafter, a program executed on the NW filter bridge 2 and a data structure used by the program will be described.

[Local Spanning Tree Program 200]

Figure 5:
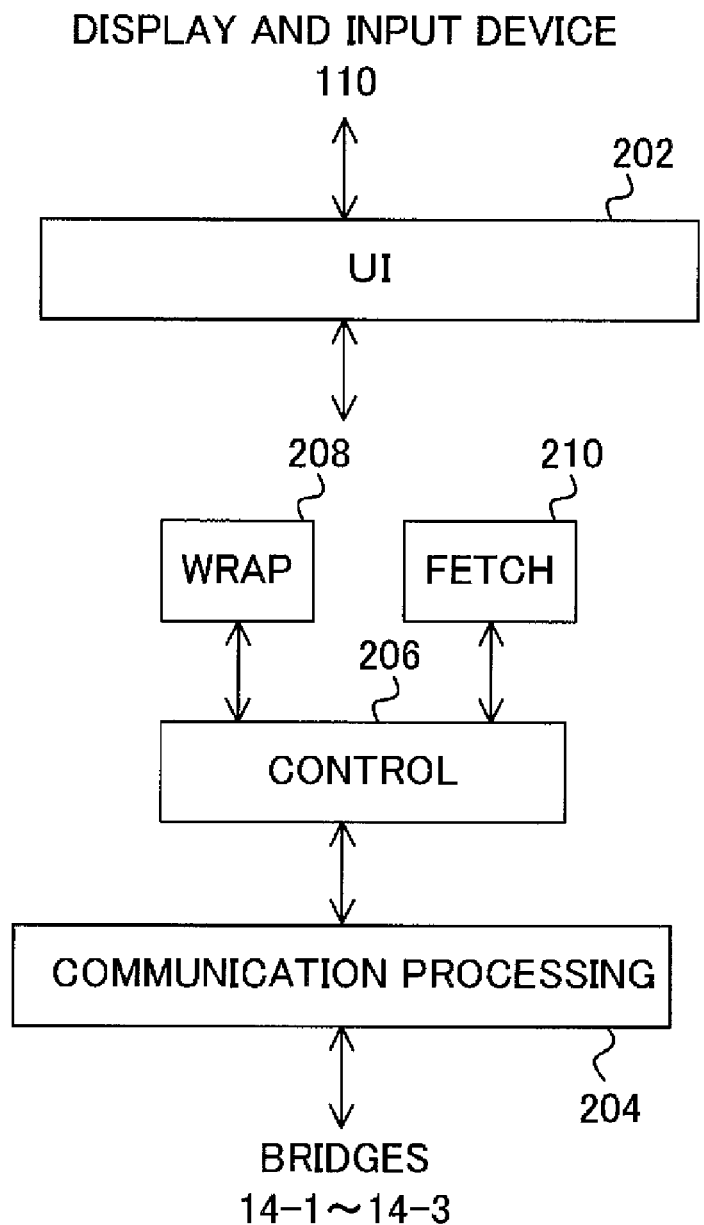
FIG. 5 A view showing a local spanning tree program 200 executed on a NW filter bridge 2 shown in FIG. 3.

FIG. 5 is a view showing a configuration of a local spanning tree program 200 executed on the NW filter bridge 2 shown in FIG. 3.

As shown in FIG. 5, the local spanning tree program 200 includes: the user interface (UI) section 202; the communication processing section 204; a control section 606; a wrap section 608; and a fetch section 210.

The local spanning tree program 200 forms a local spanning tree according to the above components as an independent bridge to 14-3.

The local spanning tree program 200 is supplied to the NW filter bridge 2, for example, through the recording medium 116 (FIG. 4) or the like to be loaded in the memory 106 to be executed on an OS.

Each of the following programs is similarly supplied to each of the nodes in order to be executed.

In the local spanning tree program 200, the UI section 202 control an operation of each of the components of the local spanning tree program 200 in accordance with the operation of the display and input device 110 (FIG. 4) by a user and the like.

Further, the UI section 202 displays data created by each of the components of the local spanning program 200, the contents of processing by each of the components and the like on the display and input device 110, or stores them in the recording device 114.

The communication processing section 204 performs a communication process required for the communication with each of the nodes.

More specifically, the communication processing section 204 performs a communication process in a second layer (a data link layer) of the OSI in accordance with an OSI reference model established by International Organization for Standardization (ISO).

The control section 206 selects a root bridge in accordance with a spanning tree algorithm (protocol) to set the RP, the DP or the BP for each of the interfaces of the communication IF 112 (FIG. 4).

By the above setting, the control section 206 sets a route for forwarding a packet in a normal case (a first route) and a route for forwarding a packet in the case where a fault occurs in the first route (a second route).

More specifically, if an input packet is a BPDU corresponding to a spanning tree protocol hello packet (a packet transmitted from the transmission side to the reception side before the start of the operation), the control section 206 discards the BPDU.

When transmitting the BPDU, the control section 206 creates the BPDU in a predetermined format and controls the wrap section 208 described below to wrap the BPDU to create another packet (a local BPDU; described below). The control section 206 broadcasts the wrapped packet through the communication IF 112.

Specifically, the control section 206 and the wrap section 208 form transmission means for creating the local BPDU containing the BPDU as a part of data and transmitting the local BPDU to another communication node.

If the input packet is the wrapped packet (the local BPDU), the control section 206 controls the fetch section 210 described below to fetch the BPDU from the packet.

The control section 206 processes the fetched BPDU in accordance with the spanning tree protocol.

Specifically, the control section 206 and the fetch section 210 form selection means for receiving the local BPDU from another communication node to select a communication route which does not induce a network loop in accordance with the BPDU contained in the local BPDU.

Moreover, the control section 206 performs a predetermined processing process on the data contained in the packet, for example, modification of a part of the data contained in the packet and the like.

The wrap section 208 wraps the BPDU to obtain a packet in a different format from that of the BPDU.

FIG. 6 is a view showing a data structure of the packet wrapped by the local spanning tree program 200.

As shown in FIG. 6, the wrapped packet (the local BPDU) contains a DA, an SA, a type, an LSTP magic, an LSTP version, and the BPDU.

In the local BPDU, the DA denotes a broadcast address.

The SA denotes a MAC address of the interface outputting the packet.

The type denotes the type of the packet; an arbitrary value (for example, 0x88ff) is set for it.

The LSTP (Local Spanning Tree Protocol) magic is an arbitrary 2-octet value (for example, 0x1cd9).

The LSTP version is an arbitrary 2-octet value (for example, 0x1).

The BPDU is an original BPDU (the packet containing a MAC header) corresponding to a target to be wrapped.

The input BPDU is wrapped by the wrap section 208 and then is output to the control section 206 as the local BPDU.

The fetch section 210 (FIG. 5) receives the local BPDU from the control section 206 to fetch the BPDU from the local BPDU, and then outputs the BPDU to the control section 206.

As described above, once the local spanning tree program 200 receives the normal BPDU, it does not allow the BPDU to pass. By broadcasting the packet (the local BPDU) obtained by wrapping the BPDU, the local spanning tree program 200 locally forms a spanning tree without affecting the other bridges having the spanning tree function.

The NW filter bridge 2 does not allow the normal BPDU to pass. As a result, since the bridge 14 cannot exchange the BPDU, the bridge 14 recognizes that the network included in the packet forwarding system 1 (FIG. 3) does not have a loop form.

Specifically, since the bridge 14 does not set the BP, the packet is not blocked by the bridge 14.

[Receiving Process of the Local Spanning Tree Program 200]

Figure 7:
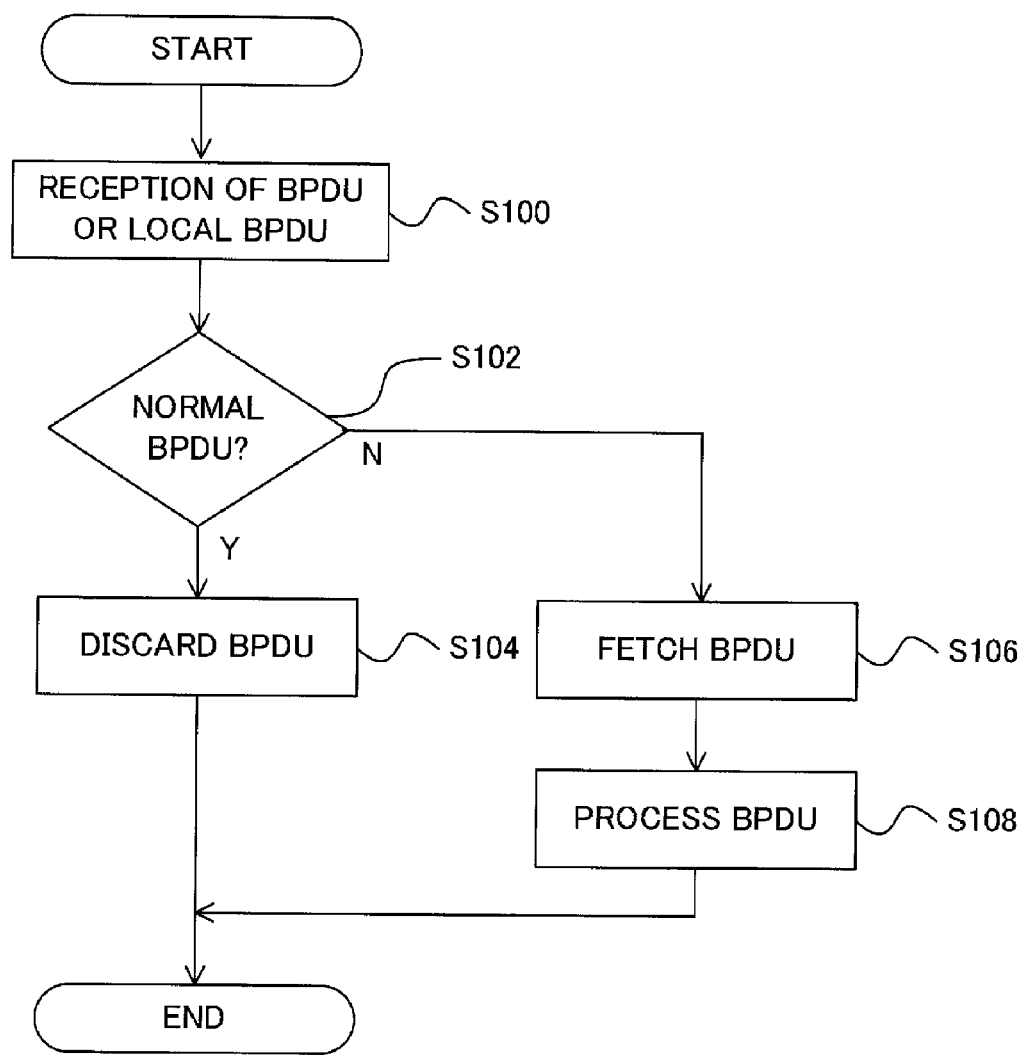
FIG. 7 A flowchart showing a receiving process (S10) implemented by the local spanning tree program 200.

FIG. 7 is a flowchart showing a receiving process (S10) implemented by the local spanning tree program 200 (FIG. 5).

As shown in FIG. 7, in step 100 (S100), the control section 206 of the local spanning tree program 200 receives the BPDU or the local BPDU input from the communication IF 112 through the communication processing section 204.

In step 102 (S102), the control section 206 determines that the received packet is the BPDU or the local BPDU.

The local spanning tree program 200 proceeds to a process at S104 if the received packet is the BPDU, whereas it proceeds to a process at S108 if the received packet is the local BPDU.

In step 104 (S104), the control section 206 discards the received BPDU.

In step 106 (S106), the control section 206 outputs the local BPDU to the fetch section 210.

The fetch section 210 fetches the original BPDU from the local BPDU and then outputs the fetched BPDU to the control section 206.

In step 108 (S108), the control section 206 processes the BPDU in accordance with the spanning tree protocol.

Specifically, the control section 206 selects a root bridge and sets the RP, the DP or the BP for each of the interfaces of the communication IF 112.

When the BP or the like is set, a route (a first route) for forwarding the packet in the network in the normal case and the second route different from the first route are set.

As described above, the local spanning tree program 200 discards the BPDU if it receives the normal BPDU, whereas the local spanning tree program 200 locally forms the spanning tree if it receives the local BPDU.

[Transmitting Process of the Local Spanning Tree Program 200]

Figure 8:
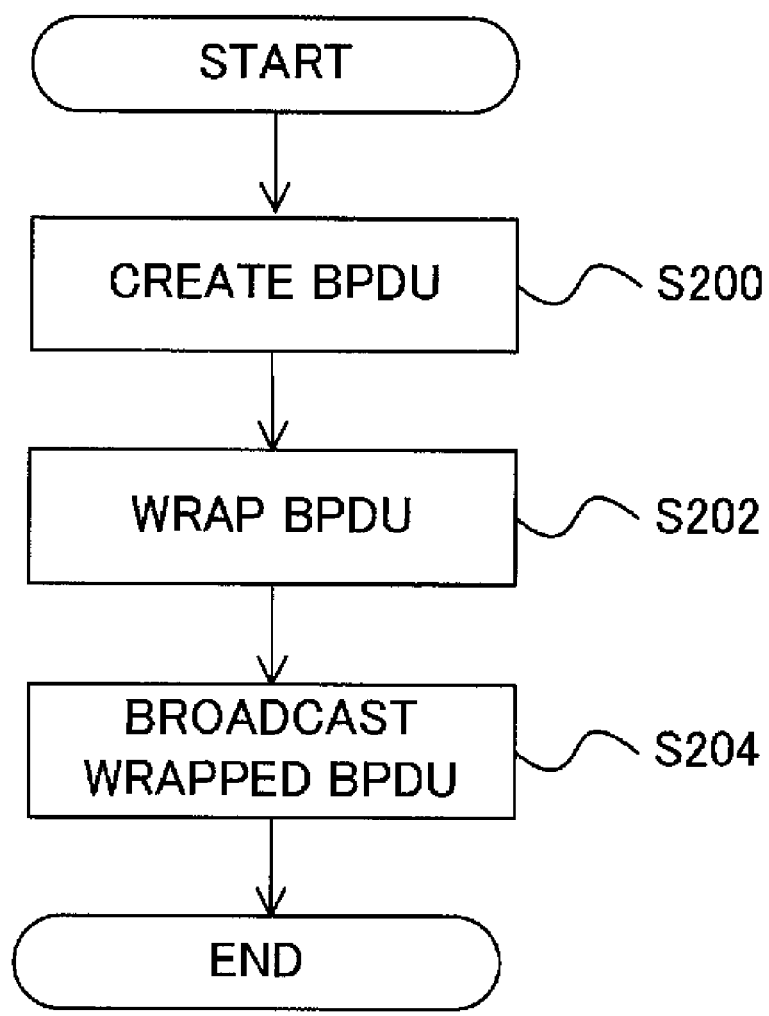
FIG. 8 A flowchart showing a transmitting process (S20) implemented by the local spanning tree program 200.

FIG. 8 is a flowchart showing a transmitting process (S20) implemented by the local spanning tree program 200 (FIG. 5).

As shown in FIG. 8, in step 200 (S200), the control section 206 of the local spanning tree program 200 creates a normal BPDU in a predetermined format.

In step 202 (S202), the control section 206 outputs the BPDU to the wrap section 208.

The wrap section 208 wraps the BPDU in a format of the local BPDU (FIG. 6) to output the wrapped BPDU to the control section 206.

In step 204 (S204), the control section 206 broadcasts the local BPDU from the communication IF 112.

As described above, the local spanning tree program 200 exchanges the local BPDU with the local spanning tree program 200 enabled on another NW filter bridge 2 without affecting the other bridges 14 having a normal spanning tree function.

[Operation of the Local Spanning Tree in the Packet Forwarding System 1]

Figure 9:
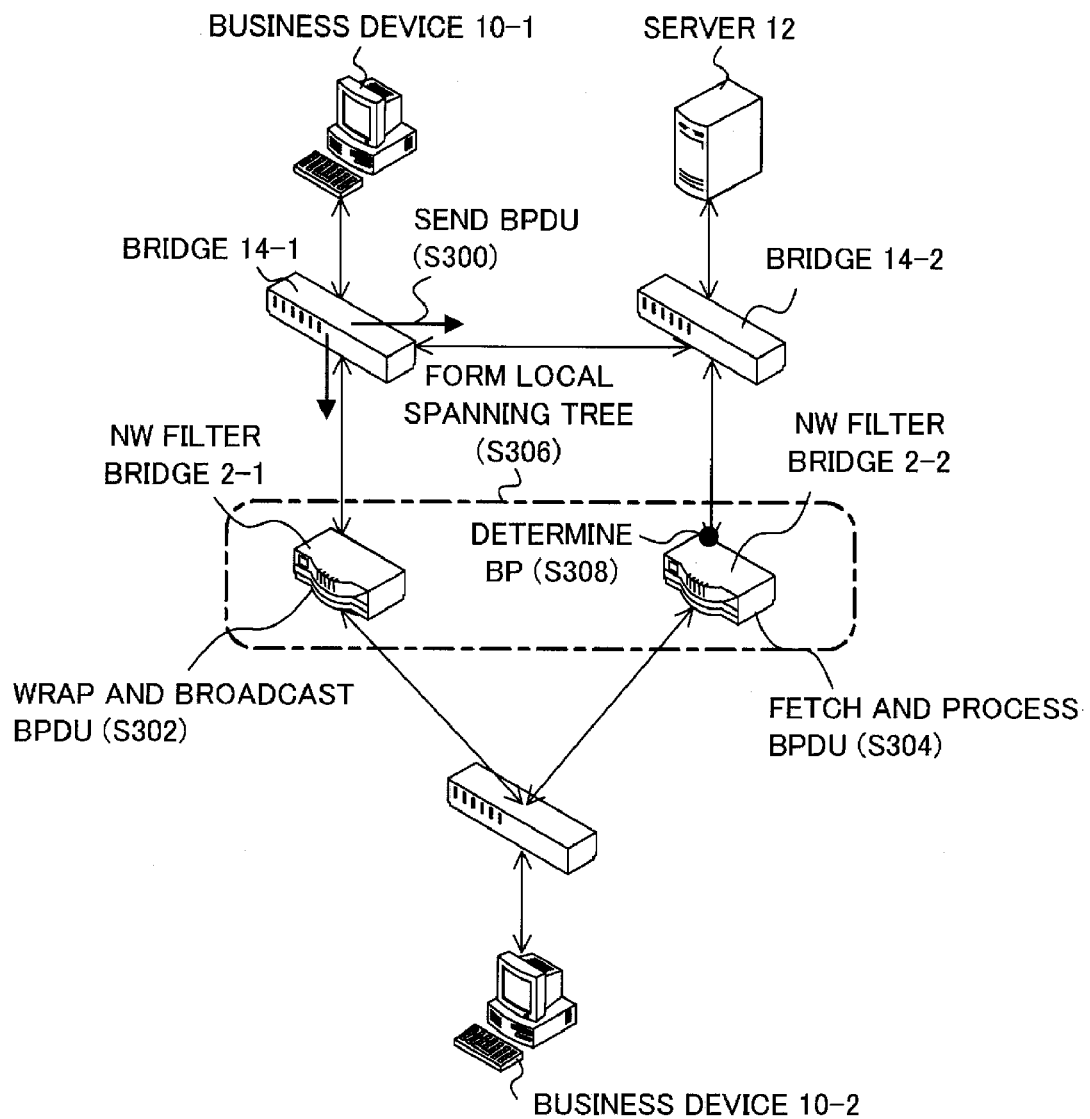
FIG. 9 A view showing an operation (S30) of a local spanning tree in the packet forwarding system 1.

FIG. 9 is a view showing an operation (S30) of the local spanning tree in the packet forwarding system 1.

As shown in FIG. 9, in step 300 (S300), the bridge 14-1 broadcasts the BPDU and exchanges the BPDU with the bridge with a spanning tree protocol (STP) being in an enable state.

In step 302 (S302), the NW filter bridge 2-1 inputs the broadcasted BPDU.

Since the received BPDU is a normal BPDU, the NW filter bridge discards the BPDU.

Furthermore, the NW filter bridge 2-1 creates another new BPDU. After wrapping the created BPDU in a format of the local BPDU, the NW filter bridge 2-1 broadcasts the wrapped BPDU.

The NW filter bridge 2-2 also inputs the BPDU broadcasted from the bridge 14-2 and discards the BPDU. After wrapping the newly created BPDU in a format of the local BPDU, the NW filter bridge 2-2 broadcasts the wrapped BPDU.

In step 304 (S304), the NW filter bridge 2-2 inputs the local BPDU wrapped by the NW filter bridge 2-1 and fetches the data of the original BPDU contained in the local BPDU.

The NW filter bridge 2-1 also inputs the local BPDU wrapped by the NW filter bridge 2-1 and fetches the data of the original BPDU contained in the local BPDU.

In step 306 (S306), the NW filter bridges 2-1 and 2-2 exchange the local BPDU with each other to form the local spanning tree.

In step 308 (S308), the NW filter bridges 2-1 and 2-2 set the RP, the DP or the BP for each of the interfaces of the communication IF 112 of the NW filter bridges 2-1 and 2-2.

Specifically, at least one interface included in the NW filter bridges 2-1 and 2-2 is set as the BP.

If the server 12 provides a service for a business device 10-1, the packet transmitted and received between the server 12 and the business device 10-1 is transmitted and received through the bridges 14-1 and 14-2.

Since the packet does not pass any of the NW filter bridges 2-1 and 2-2, the packet can be prevented from being subjected to a processing process by the NW filter bridges 2-1 and 2-2.

If the server 12 provides a service for a business device 10-2, the packet transmitted and received between the server 12 and the business device 10-2 is transmitted and received through any one of the bridges 14-1 and 14-2 to be subjected to the packet processing process.

If a failure occurs in one of the NW filter bridges, the packet processing process can be continued in the other NW filter bridge.

Thus, since the NW filter bridges 2-1 and 2-2 use the local spanning tree, a redundant configuration can be employed without affecting an existing network environment.

[Second Embodiment]

Figure 10:
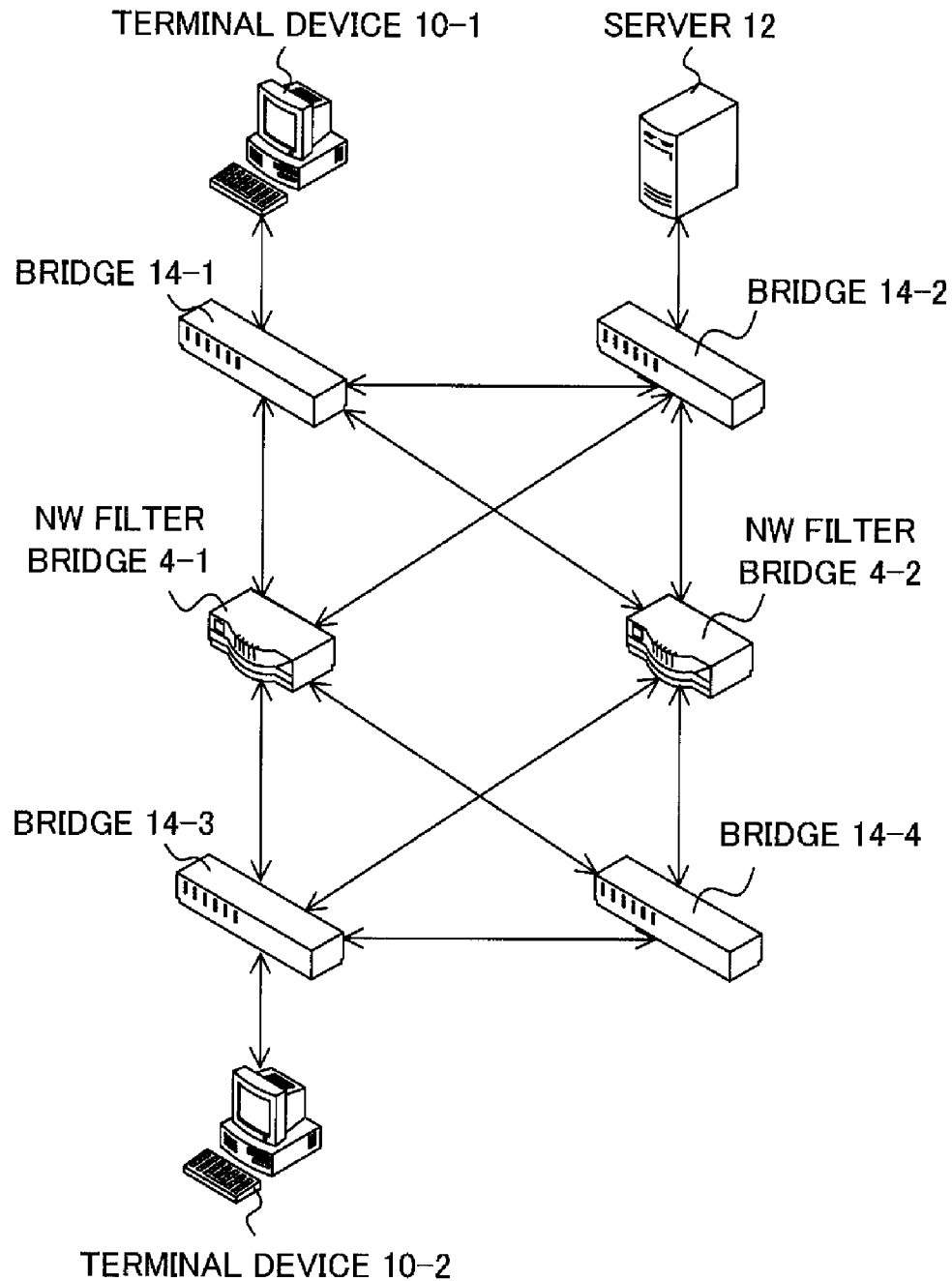
FIG. 10 A view showing a configuration of a packet forwarding system 3 according to a second embodiment of the present invention.

FIG. 10 is a view showing a configuration of a second packet forwarding system 3 according to the present invention.

As shown in FIG. 10, the packet forwarding system 3 includes NW filter bridges 4-1 and 4-2, the terminal devices 10-1 and 10-2, the server 12 and bridges 14-1 to 14-4.

The NW filter bridges 4-1 and 4-2 are connected to the bridges 14-1 to 14-4. The NW filter bridges 4-1 and 4-2 and the bridges 14-1 to 14-3 form a plurality of networks on the loop.

Each of the terminal device 10-1, the server 12 and the terminal device 10-2 is connected to the networks through the bridges 14-1 to 14-3.

[Hardware]

Figure 11:
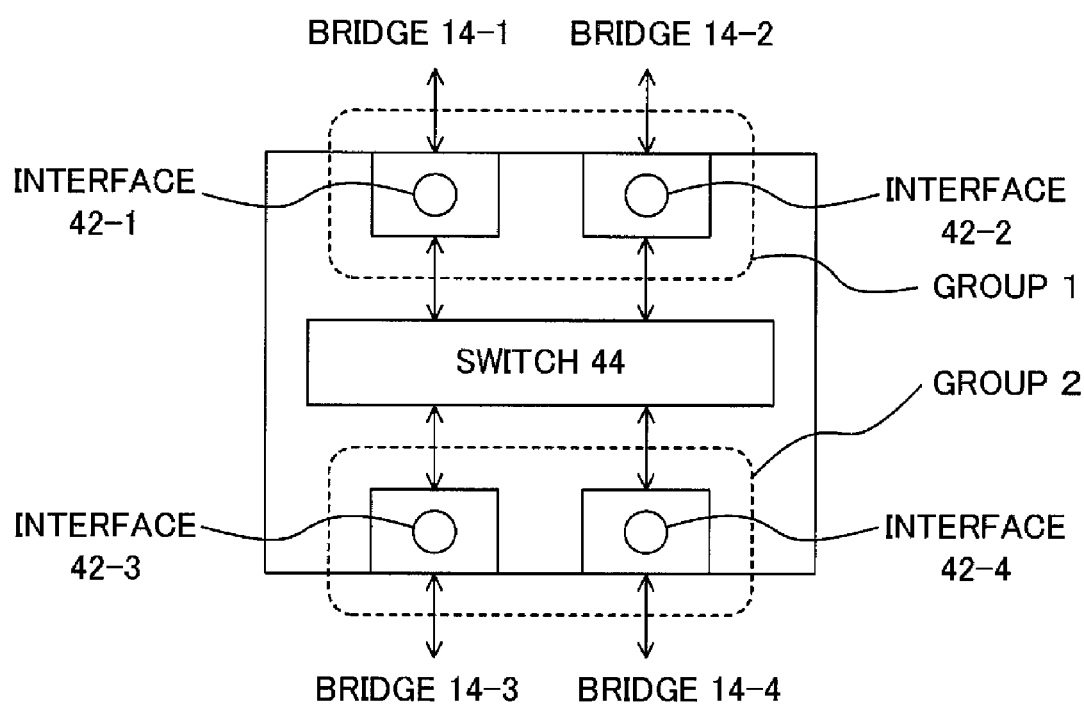
FIG. 11 A view showing a communication IF 40 of an NW filter bridge 4.

FIG. 11 is a view showing a communication IF 40 of the NW filter bridge 4.

As shown in FIG. 11, the NW filter bridge 4 includes interfaces 42-1 to 42-4 and a switch 44.

The interfaces 42-1 to 42-4 are classified into a group 1 and a group 2; the group 1 includes the interfaces 42-1 and 42-2, whereas the group 2 includes the interfaces 42-3 and 42-4.

The interfaces 42-1 to 42-4 are connected to the switch 44. The switch 44 connects two interfaces, so that the packet is communicated between the two interfaces.

[Activating process of the NW filter bridge 4]

The NW filter bridge 4 can have any one of an active state and an inactive state.

If two NW filter bridges 4 use a redundant configuration, one of the NW filter bridges 4 is brought into an active state to forward the packet, whereas the other NW filter bridge 4 goes into an inactive state not to forward the packet.

Herein, in accordance with the spanning tree protocol, if the RP or the DP is set for the interface 42, the interface 42 is brought into a "forwarding" state for forwarding the packet.

If the BP is set, the interface 42 is brought into a "block" state in order not to forward the packet.

In the second packet forwarding system 3, the control section 206 of the local spanning tree program 200 (FIG. 5) determines that the NW filter bridge 4 is brought into the active state or the inactive state.

The control section 206 brings the NW filter bridge 4 into the active state if it contains at least two interfaces 42 in the forwarding state.

The control section 204 brings the NW filter bridge 4 into the inactive state if it contains one or less interface 42 in the forwarding state.

Preferably, the control section 206 brings the NW filter bridge 4 into the active state if the groups 1 and 2 both contain the interfaces in the forwarding state.

The control section 206 brings the NW filter bridge 4 into the inactive state if at least any one of the groups 1 and 2 does not contain the interface in the forwarding state.

Figure 12:
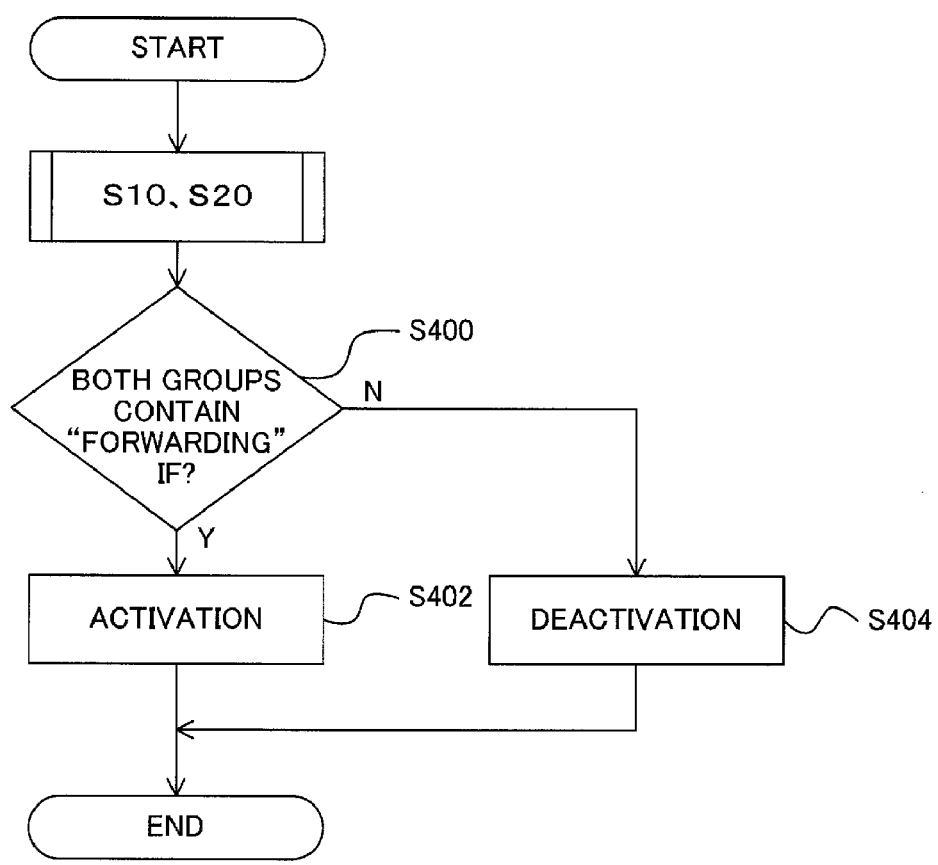
FIG. 12 A flowchart (S40) showing an activating process for determining that the NW filter bridge 4 is brought into an active state or an inactive state.

FIG. 12 is a flowchart (S40) showing an activating process for determining the NW filter bridge 4 is brought into the active state or the inactive state.

As shown in FIG. 12, when the receiving process (S10; FIG. 7) and the transmitting process (S20; FIG. 8) in the local spanning tree are implemented, each of the interfaces 42 included in the communication IF 40 of the NW filter bridge 4 is set as the RP, the DP or the BP.

In step 400 (S400), the control section 206 determines whether or not the groups 1 and 2 in the communication IF 40 both contain the interfaces 42 in the forwarding state.

If the groups 1 and 2 both contain the interfaces 42 in the forwarding state, the process proceeds to a process at S402. If not, the process proceeds to a process at S404.

In step 402 (S402), the control section 206 brings the NW filter bridge 4 into the active state so that the NW filter bridge 4 is able to forward the packet.

In step 404 (S404), the control section 206 brings the NW filter bridge 4 into the inactive state so that the NW filter bridge 4 is not able to forward the packet.

In this manner, the NW filter bridge is determined to be in the active state or the inactive state.

[Operation of the local spanning tree in the packet forwarding system 3]

Figure 13:
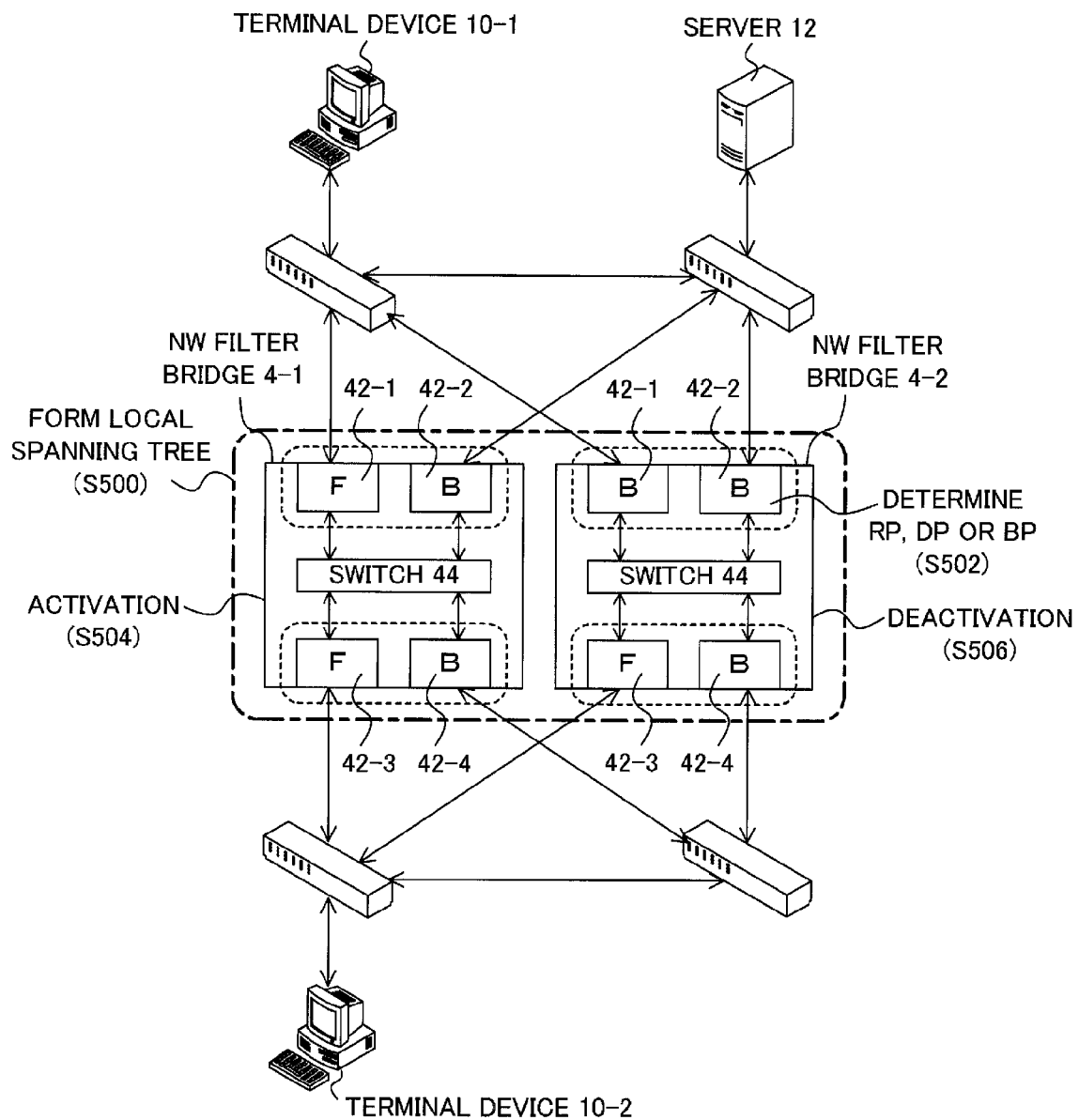
FIG. 13 A view showing an operation (S50) of a local spanning tree in the packet forwarding system 3.

FIG. 13 is a view showing an operation (S50) of the local spanning tree in the packet forwarding system 3.

As shown in FIG. 13, in step 500 (S500), when the local BPDU is exchanged between the NW filter bridges 4-1 and 4-2, the local spanning tree is formed.

In step 502 (S502), the RP, the DP or the BP is set for each of the interfaces 42 included in the communication IF 40 of each of the NW filter bridges 4-1 and 4-2.

If the RP or the DP is set, the interface 42 is brought into the forwarding state ("F" shown in FIG. 13).

If the BP is set, the interface 42 is brought into the block state ("B" shown in FIG. 13).

In step 504 (S504), the control section 206 of the local spanning tree program 200 operating in the NW filter bridge 4-1 determines to bring the NW filter bridge 4-1 into the active state or the inactive state.

The NW filter bridge 4-1 is brought into the active state because the two groups contain the interfaces 42 in the forwarding state.

In step 506 (S506), similarly in the NW filter bridge 4-2, it is determined whether or not the NW filter bridge 4-2 is brought into the active state.

Since only one of the groups contains the interface 42 in the forwarding state, the NW filter bridge 4-2 is brought into the inactive state.

In the above-described manner, only the NW filter bridge 4-1 is able to forward the packet.

In the case where the server 12 provides a service for the business device 10-2, the packet transmitted and received between the server 12 and the business device 10-2 is transmitted and received through the NW filter bridge 4-1 to be subjected to a packet processing process.

Since the NW filter bridges 4-1 and 4-2 use the local spanning tree and are activated only when the two groups contain the interfaces 42 in the forwarding state, a flexible redundant configuration can be employed without affecting an existing network environment.

[Third Embodiment]

Figure 14:
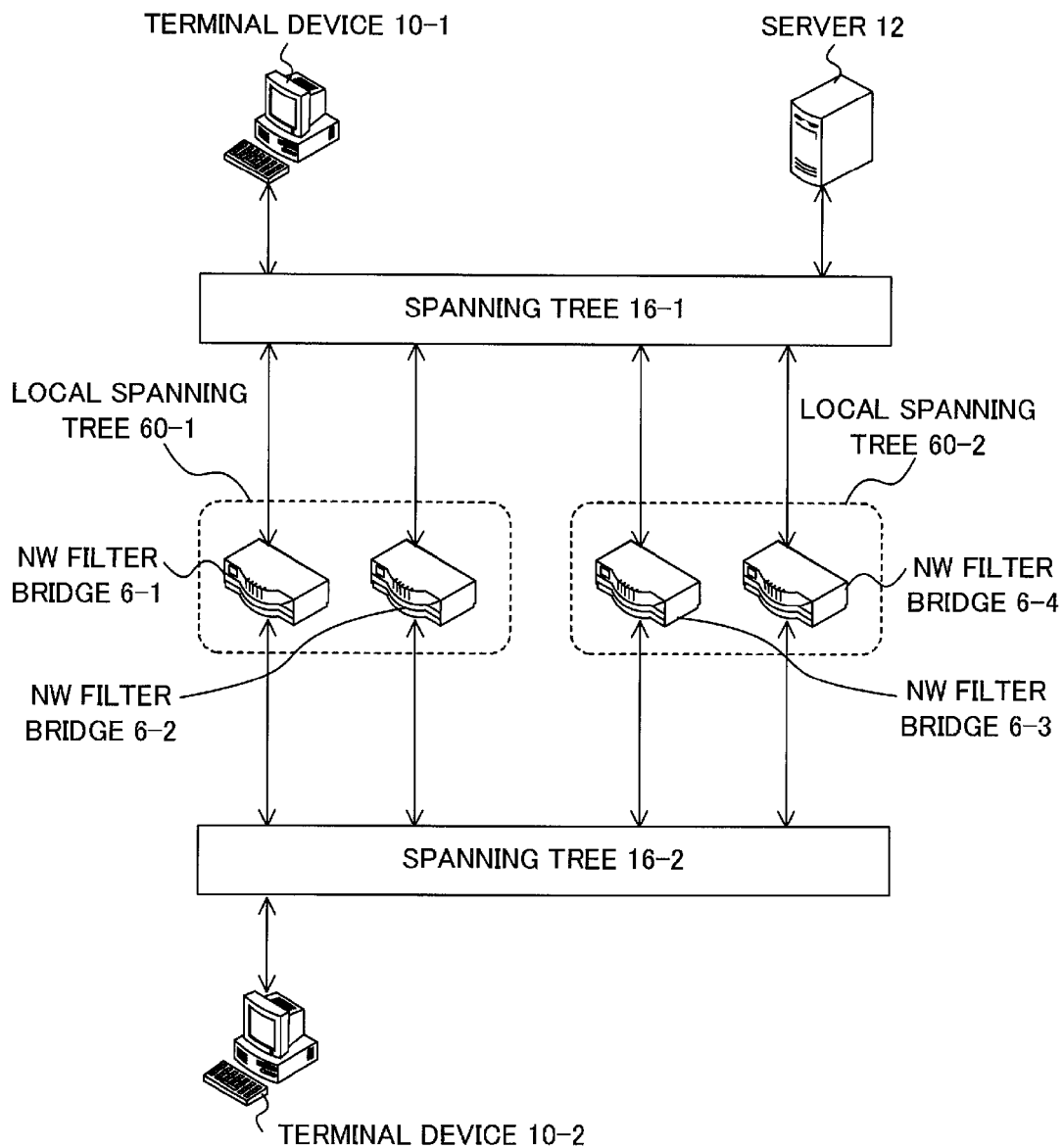
FIG. 14 A view showing a configuration of a packet forwarding system 5 according to a third embodiment of the present invention.

FIG. 14 is a view showing a configuration of a third packet forwarding system 5 according to the present invention.

As shown in FIG. 14, the packet forwarding system 5 includes NW filter bridges 6-1 to 6-4, the terminal devices 10-1 and 10-2, the server 12 and spanning trees 16-1 and 16-2 corresponding to networks for forming a spanning tree.

The NW filter bridges 6-1 to 6-4 are connected to the spanning trees 16-1 and 16-2.

The terminal device 10-1 and the server 12 are connected to the NW filter bridges 6-1 to 6-4 through the spanning tree 16-1, whereas the terminal device 10-2 is connected to the NW filter bridges 6-1 to 6-4 through the spanning tree 16-2.

[Software]

Hereinafter, a program executed on the NW filter bridge 6 and a data structure used by the program will be described.

[Local Spanning Tree Program 600]

Figure 15:
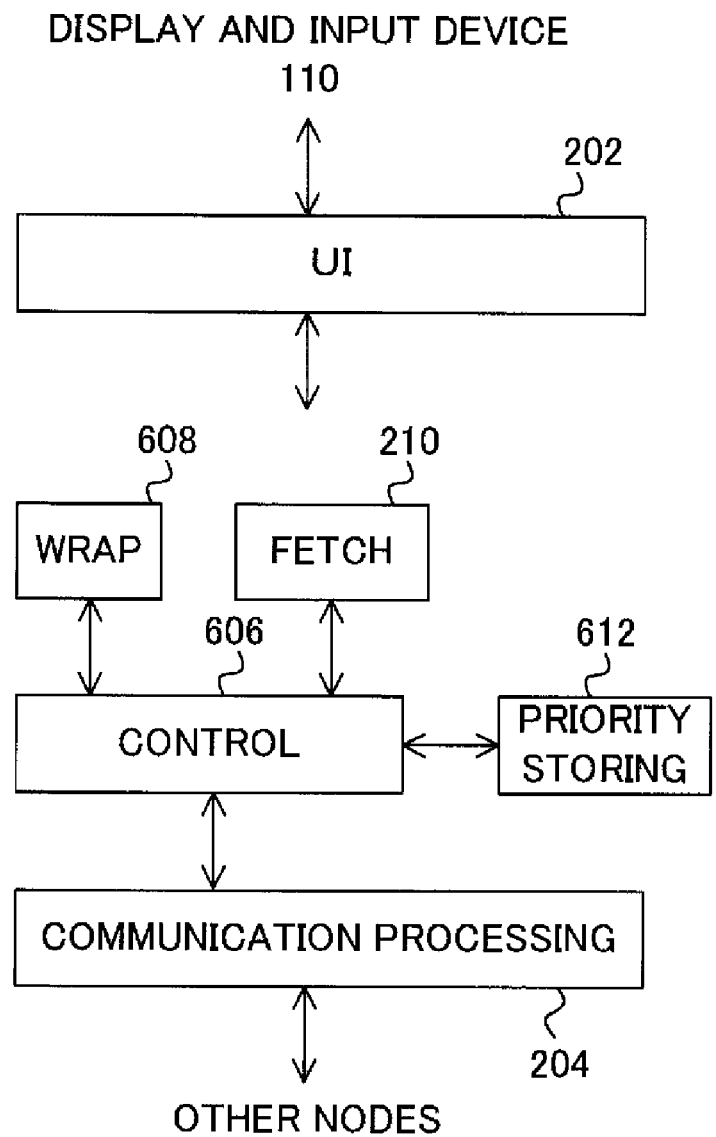
FIG. 15 A view showing a local spanning tree program 600 executed on a NW filter bridge 6 shown in FIG. 14.

FIG. 15 is a view showing a configuration of a local spanning tree program 600 executed on the NW filter bridge 6 shown in FIG. 14.

As shown in FIG. 15, the local spanning tree program 600 includes: the user interface (UI) section 202; the communication processing section 204; a control section 606; a wrap section 608; the fetch section 210; and a priority storing section 612.

Among the components shown in FIG. 15, substantially the same components as those shown in FIG. 5 are denoted by the same reference numerals.

The local spanning tree program 600 forms a local spanning tree with the above components in accordance with the priority.

In the local spanning tree program 600, the priority storing section 612 stores the priority indicating the order of priority of the local spanning tree.

The priority is input in advance by using the display and input device 110 (FIG. 4) of the NW filter bridge 6 and the like to be stored in the priority storing section 612.

The priority can be taken into account if a plurality of local spanning trees are included in the network.

The wrap section 608 wraps the BPDU to obtain a packet in a different format from that of the BPDU.

FIG. 16 is a view showing a data structure of the packet wrapped by the local spanning tree program 600.

As shown in FIG. 16, the wrapped packet (the local BPDU) contains the DA, the SA, the type, the LSTP magic, the LSTP version, an LSTID and the BPDU.

In the local BPDU, the LSTID denotes the priority and is, for example, a 2-octet positive integer that is not 0.

The control section 606 (FIG. 15) performs predetermined control in accordance with the priority stored in the priority storing section 612 and the priority contained in the input local BPDU in the case where the input packet is the local BPDU.

More specifically, the control section 606 controls the BPDU based on the following rules.

1. If the priority contained in the input local BPDU is higher than the stored priority, the control section 606 discards the input local BPDU.

2. If the priority contained in the input local BPDU is lower than the stored priority, the control section 606 allows the input local BPDU to pass.

3. If the priority contained in the input local BPDU and the stored priority are identical with each other, the control section 606 causes the fetch section 210 to fetch the BPDU to use the fetched BPDU in accordance with the spanning tree protocol.

Figure 17:
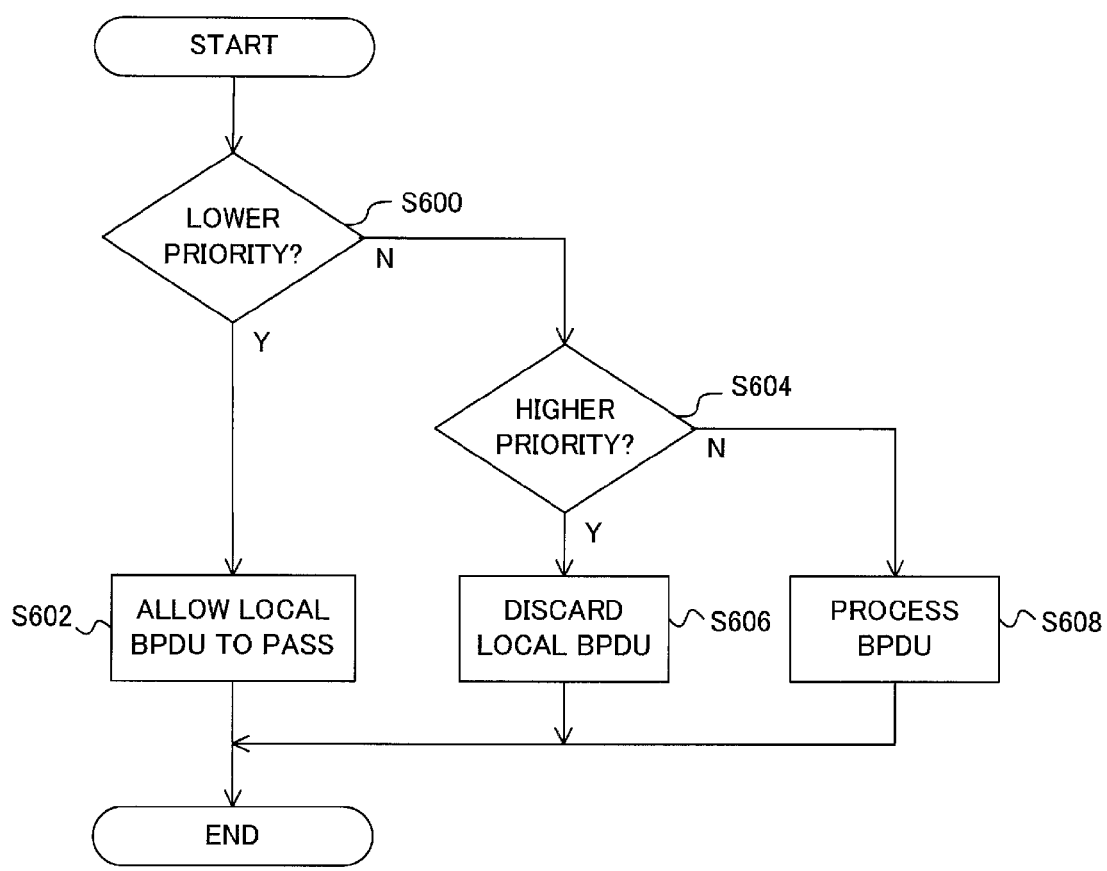
FIG. 17 A flowchart showing a priority determining process (S60) by the local spanning tree program 600.

FIG. 17 is a flowchart showing a priority determining process (S60) in accordance with the local spanning tree program 600.

As shown in FIG. 17, in step 600 (S600), the control section 606 of the local spanning tree program 600 determines whether or not the priority contained in the input local BPDU is lower than the stored priority. If it is lower, the process proceeds to a process at S602. If not, the process proceeds to a process at S604.

In step 602 (S602), the control section 606 broadcasts the input local BPDU from the communication IF 112 to allow the local BPDU to pass.

In step 604 (S604), the control section 606 determines whether or not the priority contained in the input local BPDU is higher than the stored priority. If it is higher, the process proceeds to a process at S606. If not, the process proceeds to a process at S608.

In step 606 (S606), the control section 606 discards the input local BPDU.

Specifically, the local BPDU does not pass through the NW filter bridge 6 on which the local spanning tree program 600 is operating.

In step 608 (S608), the control section 606 outputs the local BPDU to the fetch section 210. The fetch section 210 fetches the original BPDU from the local BPDU to output the fetched BPDU to the control section 606.

The control section 606 processes the fetched BPDU in accordance with the spanning tree program to set the RP, the DP or the BP for each of the interfaces of the communication IF 112.

In this manner, the NW filter bridge 6 storing lower priority does not allow the local BPDU having higher priority to pass, whereas the NW filter bridge 6 storing higher priority allows the local BPDU having lower priority to pass. Therefore, the NW filter bridge storing the lower priority inputs the local BPDU broadcasted automatically again.

Therefore, the local spanning tree having the lower priority can be formed in the loop-shaped network.

If the NW filer bridge 6 is contained in the formed local spanning tree, any one of the interfaces of the communication IF in this NW filter bridge 6 sets the BP.

When the BP is set, the NW filter bridge 6 does not forward the packet using the interface with the BP being set.

In this manner, in the case where a plurality of local spanning trees are contained in the same network, the packet can be transmitted and received through the NW filter bridge having the higher priority.

[Operation of the Local Spanning Tree in the Packet Forwarding System 5]

Figure 18:
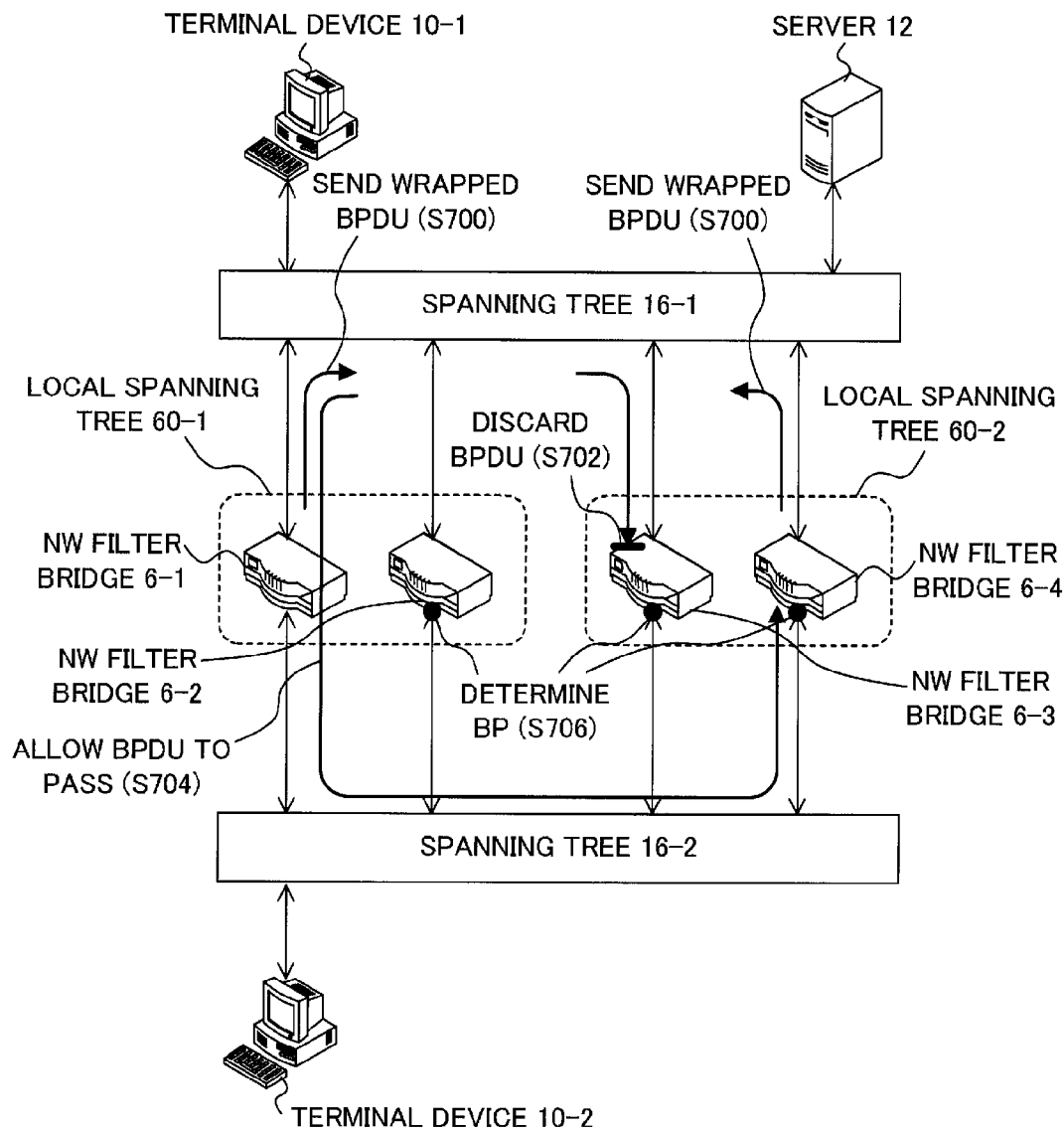
FIG. 18 A view showing an operation (S70) of a local spanning tree in the packet forwarding system 5.

FIG. 18 is a view showing an operation (S70) of the local spanning tree in the packet forwarding system 5.

In FIG. 18, a local spanning tree 60-1 has higher priority than that of a local spanning tree 60-2.

As shown in FIG. 18, in step 700 (S700), upon reception of the BPDU broadcasted from the bridge forming the spanning tree 16-1 or the like, the NW filter bridge 6-1 discards the BPDU.

Furthermore, the NW filter bridge 6-1 creates another new BPDU and wraps the created BPDU to broadcast the wrapped BPDU (the local BPDU).

Each of the other NW filter bridges 6-2 to 6-4 also discards the normal BPDU and wraps the created new BPDU to broadcast the local BPDU.

In step 702 (S702), the NW filter bridge 6-3 discards the local BPDU having higher priority broadcasted from the NW filter bridge (for example, the NW filter bridge 6-1) included in the local spanning tree 60-1.

In step 704 (S704), the NW filter bridge 6-1 allows the local BPDU having lower priority broadcasted from the NW filter bridge (for example, the NW filter bridge 6-3) included in the local spanning tree 60-2 to pass.

Specifically, each of the NW filter bridges 6-3 and 6-4 inputs the local BPDU broadcasted by itself.

In step 706 (S706), the NW filter bridges 6-1 to 6-4 determine the RP, the DP and the BP.

Herein, the NW filter bridge 6-1 included in the local spanning tree 60-1 only exchanges the local BPDU with the NW filter bridge 6-2; it does not input the local BPDU broadcasted by itself.

Therefore, the BP is set only for any one of the NW filter bridges 6-1 and 6-2.

The NW filter bridge 6-3 included in the local spanning tree 60-2 exchanges the local BPDU with the NW filter bridge 6-4 while inputting the local BPDU broadcasted by itself.

Therefore, since the BP is set in both the NW filter bridges 6-3 and 6-4, the NW filter bridge included in the local spanning tree having lower priority does not forward the packet.

In this manner, even in the case where a plurality of local spanning trees are included in the same network, the NW filter bridge controls the local BPDU in accordance with the priority of the local spanning tree. Therefore, the packet transmitted and received between the server 12 and the business device 10-2 can be transmitted and received through a predetermined NW filter bridge. Accordingly, the NW filter bridges 6 can employ a flexible redundant configuration.

[Practical Example]

For the local spanning tree (FIGS. 15 to 17) taking priority into account, an example in the configuration of the packet forwarding system 1 (FIG. 3) will be described.

The local spanning tree program 600 operates on an OS. The OS is GNU/LINUX (linux-2.6 based) ("LINUX" is a registered trademark).

The implementation policy is as follows.

1. A net-filter hook included in a bridge module or the like is used, and a patch is not applied to the bridge module.

2. A single kernel module obtains the local BPDU from the BPDU, fetches the BPDU from the local BPDU, and performs normal BPDU filtering.

3. The module is controlled by using the ebtables utility.

The specifications of the kernel module are as follows.

1. The LSTID can be set via sysctl.

2. A spanning tree protocol of the bridge module is initially inhibited.

3. In the local spanning tree module, the LSTID is 0 and all the functions of the local spanning tree are inhibited immediately after the module is loaded.

4. Since the net-filter hook of a BPDU sending section is used, a target named "lstp" is set as an output chain of a filter table by ebtables.

5. When the LSTID is set within the range of 1 to 65535 after the above operation 4, the functions of the local spanning tree become valid.

6. The spanning tree of the bridge module is validated.

It is vital that the above 2 to 6 steps are set in this order.

The above-described 4 step is a vital restriction required for using the net-filter hook of the BPDU output section of the bridge module.

When the LSTID is set to 2 after the implementation is performed based on the above-described specifications, the formation of a local spanning tree is confirmed in the network having the configuration of the packet forwarding system 1 (FIG. 3).

Industrial Applicability

The present invention can be used for a packet forwarding system and a packet forwarding device.

The invention claimed is:

1. A signal forwarding system comprising, a plurality of communication nodes, the plurality of communication nodes including a plurality of forwarding devices, a plurality of communication routes, each for forwarding a signal through at least one of the communication nodes, being possibly present between arbitrary ones of the communication nodes, wherein each of the forwarding devices includes:

transmission means for receiving a first unwrapped signal from another one of the communication nodes to create a first wrapper signal containing the first unwrapped signal, the first wrapper signal not being used by the another communication node for selection of a communication route, and of transmitting the first wrapper signal to a further one of the communication nodes; and selection means for receiving a second wrapper signal from a communication node and selecting one from the plurality of communication routes in accordance with a second unwrapped signal contained in the second wrapper signal.

2. The signal forwarding system according to claim 1, wherein the first unwrapped signal and the second unwrapped signal are the same as one another.

3. The signal forwarding system according to claim 1, wherein the first wrapper signal and the second wrapper signal are the same as one another.

4. A forwarding device, which is connected to a network including a plurality of communication nodes connected to each other, a plurality of communication routes, each for forwarding a signal through at least one of the communication nodes, being possibly present between arbitrary ones of the communication nodes in the network, comprising:

transmission means for receiving a first unwrapped signal from another one of the communication nodes to create a first wrapper signal containing the first unwrapped signal, the first wrapper signal not being used by the another communication node for selection of a communication route, and transmitting the first wrapper signal to a further one of the communication nodes; and selection means for receiving a second wrapper signal from a communication node and selecting one from the plurality of communication routes in accordance with a second unwrapped signal contained in the second wrapper signal.

5. The forwarding device according to claim 4, wherein:
the signal is a packet; and
the transmission means wraps the first unwrapped signal to create a packet containing the first unwrapped signal as a part of data and then transmits the packet to the further communication node.

6. The forwarding device according to claim 4, wherein:
the first unwrapped signal is a hello packet transmitted and received between the communication nodes in accordance with a spanning tree protocol.

7. The forwarding device according to claim 4, wherein:

the selection means selects a communication route through which the signal transmitted and received by an arbitrary one of the communication nodes can be forwarded without passing one communication node twice or more times.

8. The forwarding device according to claim 4, further comprising at least two input and output means for inputting and outputting the signal, wherein:
the selection means determines whether or not to allow each of the input and output means to input and output the signal in accordance with a spanning tree protocol; and
the signal can be forwarded if the at least two input and output means are allowed to input and output the signal.

9. The forwarding device according to claim 8, wherein:
each of the input and output means is contained in any of at least two groups; and
the signal can be forwarded if the at least two groups contain the input and output means allowed to input and output the signal.

10. The forwarding device according to claim 4, further comprising priority storing means for storing priority indicating a predetermined order of priority, wherein:
the transmission means creates the first wrapper signal further containing the stored priority and transmits the first wrapper signal to a further one of the communication nodes; and
the selection means selects one from the plurality of communication routes in accordance with the priority contained in the second wrapper signal received from a communication node and the stored priority.

11. The forwarding device according to claim 10, wherein the selection means discards the second wrapper signal if the priority contained in the second wrapper signal received from the further communication node is higher than the stored priority.

12. The forwarding device according to claim 10, wherein the selection means discards the second wrapper signal if the priority contained in the second wrapper signal received from the further communication node is lower than the stored priority.

13. The forwarding device according to claim 10, wherein the selection means selects one from the plurality of communication routes if the priority contained in the signal received from the further communication node and the stored priority are identical with each other.

14. The forwarding device according to claim 4, wherein the first unwrapped signal and the second unwrapped signal are the same as one another.

15. The forwarding device according to claim 4, wherein the first wrapper signal and the second wrapper signal are the same as one another.

16. A forwarding method, which is used for a forwarding device connected to a network including a plurality of communicating nodes connected to each other, a plurality of communication routes, each for forwarding a signal through at least one of the communication nodes, being possibly present between arbitrary ones of the communication nodes in the network, the forwarding method comprising:
receiving a first unwrapped signal from another one of the communication nodes to create a first wrapper signal containing the first unwrapped signal, the first wrapper signal not being used by the another communication node for selection of a communication route, and transmitting the first wrapper signal to a further one of the communication nodes; and
receiving a second wrapper signal from a communication node and selecting one from the plurality of communication routes in accordance with a second unwrapped signal contained in the second wrapper signal.

17. The forwarding method according to claim 16, wherein the first unwrapped signal and the second unwrapped signal are the same as one another.

18. The forwarding method according to claim 16, wherein the first wrapper signal and the second wrapper signal are the same as one another.

19. A computer memory that has a program stored thereon, wherein the program, which is used for a forwarding device including a computer and connected to a network including a plurality of communicating nodes connected to each other, a plurality of communication routes, each for forwarding a signal through at least one of the communication nodes, being possibly present between arbitrary ones of the communication nodes in the network, the program causing the computer to execute the steps of:
receiving a first unwrapped signal from another one of the communication nodes to create a first wrapper signal containing the first unwrapped signal, the first wrapper signal not being used by the another communication node for selection of a communication route, and transmitting the first wrapper signal to a further one of the communication nodes; and
receiving a second wrapper signal from a communication node and selecting one from the plurality of communication routes in accordance with a second unwrapped signal contained in the second wrapper signal.

20. The computer memory that has a program stored thereon according to claim 19, wherein the first unwrapped signal and the second unwrapped signal are the same, and wherein the first wrapper signal and the second wrapper signal are the same as one another.

* * * * *

UNITED STATES PATENT AND TRADEMARK OFFICE
CERTIFICATE OF CORRECTION

| | | |
|---|---|---|
| PATENT NO. | : 8,170,034 B2 | Page 1 of 1 |
| APPLICATION NO. | : 11/817611 | |
| DATED | : May 1, 2012 | |
| INVENTOR(S) | : Katsuyuki Yumoto | |

It is certified that error appears in the above-identified patent and that said Letters Patent is hereby corrected as shown below:

On the Title page, in field (73), Assignee, in column 1, line 1, delete "Hewlet" and insert -- Hewlett --, therefor.

Signed and Sealed this
Fourth Day of December, 2012

David J. Kappos
*Director of the United States Patent and Trademark Office*